United States Patent
Singh et al.

(10) Patent No.: US 9,971,658 B2
(45) Date of Patent: May 15, 2018

(54) CLIENT DEPLOYMENT WITH DISASTER RECOVERY CONSIDERATIONS

(71) Applicant: VMWARE, INC., Palo Alto, CA (US)

(72) Inventors: Rajesh Singh, Bangalore (IN); Girish Ramchandra Rao, Bangalore (IN); Puneet Gupta, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 131 days.

(21) Appl. No.: 14/644,218

(22) Filed: Mar. 11, 2015

(65) Prior Publication Data
US 2016/0203060 A1 Jul. 14, 2016

(30) Foreign Application Priority Data

Jan. 9, 2015 (IN) .......................... 0162/CHE/2015

(51) Int. Cl.
*G06F 11/00* (2006.01)
*G06F 11/14* (2006.01)

(52) U.S. Cl.
CPC .......... *G06F 11/1469* (2013.01); *G06F 11/00* (2013.01); *G06F 11/1451* (2013.01); *G06F 11/1464* (2013.01); *G06F 2201/84* (2013.01); *G06F 2201/85* (2013.01)

(58) Field of Classification Search
CPC ............. G06F 11/1469; G06F 11/1451; G06F 11/1464; G06F 11/0712; G06F 11/1402; G06F 11/1446; G06F 11/1448; G06F 11/301; G06F 2201/84; G06F 2201/85; G06F 11/00
USPC .................................................... 714/15, 4.11
See application file for complete search history.

(56) References Cited

U.S. PATENT DOCUMENTS

| 8,266,473 | B2* | 9/2012 | Casale ..................... H04L 12/24 714/15 |
| 9,274,903 | B1* | 3/2016 | Garlapati ............ G06F 11/2002 |
| 2009/0307166 | A1* | 12/2009 | Routray ................... G06N 5/04 706/46 |
| 2011/0258481 | A1* | 10/2011 | Kern .................... G06F 11/1484 714/4.1 |
| 2012/0284555 | A1* | 11/2012 | Akirav ................ G06F 11/1456 714/4.1 |
| 2013/0326260 | A1* | 12/2013 | Wei .......................... G06F 11/20 714/3 |
| 2014/0278326 | A1* | 9/2014 | Sharma ..................... G06F 8/60 703/13 |

* cited by examiner

*Primary Examiner* — Joseph D Manoskey

(57) ABSTRACT

A system and method for deploying clients at a target site with disaster recovery considerations uses recovery profiles with multiple recovery parameter settings, which can be associated with a client to be deployed. The recovery profile associated with the client is used to automatically initiate a recovery-related operation for the client using a recovery parameter setting defined in the recovery profile associated with the client.

17 Claims, 6 Drawing Sheets

CLIENT DEPLOYMENT WITH DISASTER RECOVERY CONSIDERATIONS

CROSS-REFERENCE TO RELATED APPLICATION(S)

Benefit is claimed under 35 U.S.C. 119(a)-(d) to Foreign application Serial No. 162/CHE/2015 filed in India entitled "CLIENT DEPLOYMENT WITH DISASTER RECOVERY CONSIDERATIONS", on Jan. 9, 2015, by VMware, Inc., which is herein incorporated in its entirety by reference for all purposes.

BACKGROUND

Resource-consuming clients, such as virtual machines (VMs) or other software entities capable of running various applications, can be used to deploy applications in one or more virtual datacenters, which are virtualized collections of computing, storage, and networking resources of a distributed computer system. The physical resources that support the clients in the virtual datacenters may be located at one or more physical sites. Since at least some of the clients may be running business-critical applications, disaster recovery management systems may be deployed at some of the sites so that these clients can be recreated at recovery sites when needed to ensure that these applications can continue to operate.

Since the clients running the applications may require different disaster recovery requirements, the clients are typically associated with different disaster recovery parameters to ensure that their disaster recovery requirements are satisfied. These disaster recovery parameters may include options for replication type/techniques, recovery point objective (RPO) durations, and other known disaster recovery parameters. The different disaster recovery parameters need to be manually entered for each client using a user interface once the clients are deployed, which can be tedious and prone to errors.

SUMMARY

A system and method for deploying clients at a target site with disaster recovery considerations uses recovery profiles with multiple recovery parameter settings, which can be associated with a client to be deployed. The recovery profile associated with the client is used to automatically initiate a recovery-related operation for the client using a recovery parameter setting defined in the recovery profile associated with the client.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
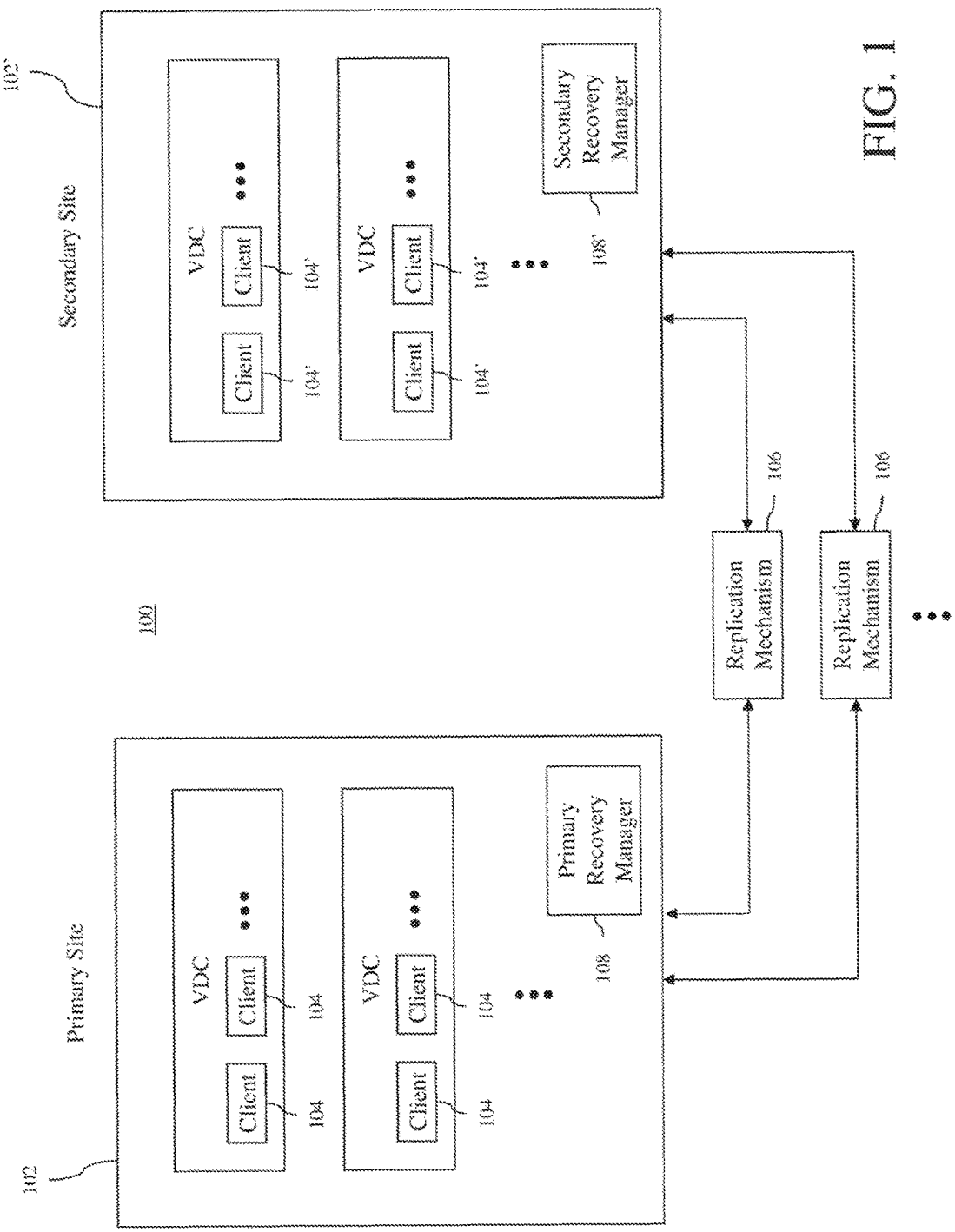
FIG. 1 is a block diagram of a site recovery system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments in accordance with the invention allow clients or other software entities to be deployed with disaster recovery considerations so that these clients or software entities can be automatically protected with respect to disaster recovery. As described in more detail below, different recovery profiles may be used to provide different types of disaster protection so that more important clients or software entities are more highly protected than less important clients or software entities.

Turning now to FIG. 1, a site recovery system 100 in accordance with an embodiment of the invention is shown. As shown in FIG. 1, the site recovery system includes a primary site 102, which is the protected site, and a secondary site 102', which is the recovery site. These sites may be located at different geographical locations so that failures or "disasters" at the primary site would not affect the secondary site. As described in more detail below, each of these sites includes sufficient hardware and software components to provide a computing environment for a number of clients 104 and 104' to execute various applications. As used herein, "clients" refer to any software entities that can run on a computer system, such as software applications, software processes, virtual machines (VMs) and "containers" that provide system-level process isolation. In some implementations, these clients can be grouped as one or more virtual datacenters (VDCs) to support different services or functions. The clients 104 at the primary site are protected clients running in the primary site. The clients 104' at the secondary site are replicas of the protected clients (sometimes referred to herein as "recovered clients") that are deployed or recreated when a failure occurs at the primary site. The site recovery system provides disaster protection for at least some of the clients 104 running in the primary site so that, in the event of a disaster or failure at the primary site, these protected clients are automatically recovered at the secondary site in a consistent failover process. Although only one secondary site is shown and described herein, there can be any number of secondary sites at which the protected clients at the primary site can be selectively recovered. Thus, the protected clients at the primary site may be recovered at more than one secondary site.

As shown in FIG. 1, the site recovery system 100 further includes one or more replication mechanisms 106, a primary recovery manager 108 and a secondary recovery manager 108'. Each of the replication mechanisms operates to periodically replicate data at the primary site 102, which is related to the protected clients 104, to the second site 102' so that these clients can be recreated at the second site as the replicated clients 104' when needed, e.g., when a failure occurs at the primary site. The replicated data includes at least the files of the protected clients that are needed to recreate the protected clients in a new computing environment, which may include, but not limited to, configuration files and virtual disk files. The replication mechanisms may perform replication of the data from the primary site to the secondary site using any storage or database replication process. In some embodiments, the operations performed by the replication mechanisms may be provided to the primary and secondary sites as a service.

In some embodiments, one or more of the replication mechanisms 106 may create storage snapshots or snapshots of the protected clients 104 at the secondary site 102' using the replicated data from the primary site 102 at the secondary site. A storage snapshot is a state of a storage device or a storage array at a particular point in time, which can be used to restore stored data. A snapshot of a client is a file-based representation of the state of the client at a particular point in time. For a virtual machine, a snapshot includes the state of all the virtual machine's disks (or non-volatile computer memory), the contents of the virtual machine's memory (or volatile computer memory) and the virtual machine settings. The snapshot of a client includes at minimum all the files necessary to recreate or replicate the client, e.g., a virtual machine, in a computing environment. The storage or client snapshots may be captured at different times to provide multiple points in time (MPIT) disaster recovery. The storage or client snapshots are used to recreate the protected clients 104 at the secondary site as the replicated clients 104' when needed, e.g., during a failover process. In some implementations, the snapshot creation process at the secondary site may be performed by another component, which may reside at the secondary site or may reside external to the secondary site.

In other embodiments, one or more of the replication mechanisms 106 may periodically create storage snapshots or snapshots of the protected clients 104 at the primary site 102 using the available data at the primary site. The snapshots may then be replicated to the secondary site 102' so that the snapshots are available at the secondary site to recreate the protected clients 104 at the secondary site as the replicated clients 104' when needed, e.g., during a failover process. In some implementations, the snapshot creation process at the primary site may be performed by another component, which may reside at the primary site or may reside external to the primary site.

Each of the replication mechanisms 106 can be any known mechanism for replicating data from one storage device or storage array to another storage device or storage array, regardless of the physical locations of the storage devices or arrays. As an example, one of the replication mechanisms may be a proprietary replication mechanism, such as VMware vSphere® Replication mechanism. As another example, one of the replication mechanisms may be an array-based replication mechanism, such as SQLite replication. These replication mechanisms include various software and/or hardware modules to perform their functions of replicating data from a source storage device/array to a destination storage device/array.

The primary recovery manager 108 controls various operations at the primary site 102 to provide disaster protection. As an example, the primary recovery manager allows management of recovery plans, enables nondisruptive recovery testing and executes site recovery and migration processes. The secondary recovery manager 108' controls various operations at the secondary site 102' to provide disaster protection. The secondary recovery manager works in conjunction with the primary recovery manager to perform various operations related to disaster protection. In a particular implementation, each of the primary and secondary recovery managers may be a VMware vCenter™ Site Recovery Manager™.

The operations of the replication mechanisms 106 and the primary and secondary recovery managers 108 and 108' will be described in more detail below. These components of the site recovery system 100 can be implemented as software, hardware or a combination of software and hardware. In some embodiments, at least some of these components are implemented as one or more software programs running in one or more computer systems using one or more processors associated with the computer systems.

Figure 2:
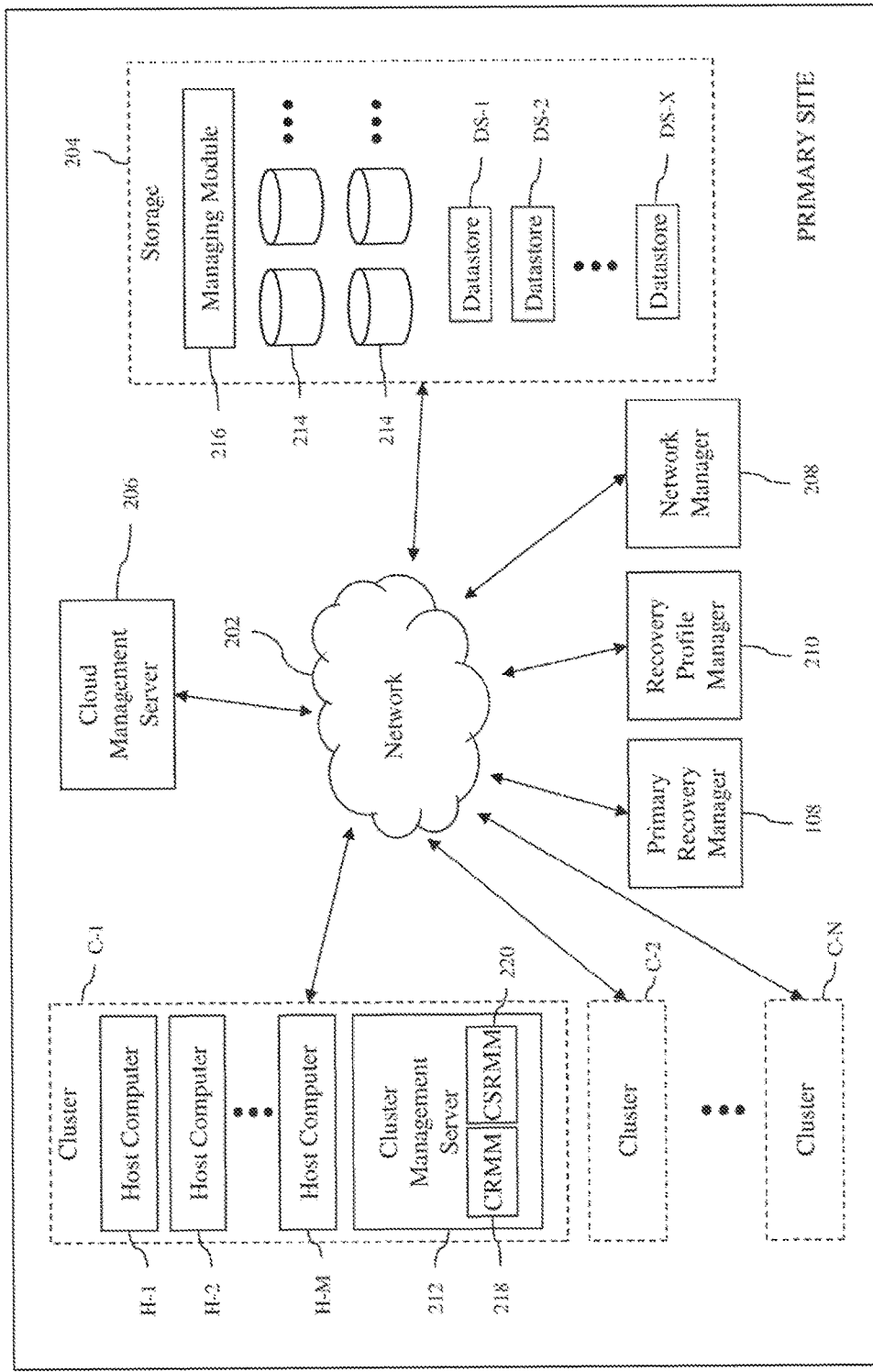
FIG. 2 is a block diagram of a primary site of the site recovery system in accordance with an embodiment of the invention.

Turning now to FIG. 2, the primary site 102 in accordance with an embodiment of the invention is illustrated. As shown in FIG. 2, the primary site includes a network 202, clusters C-1, C-2 . . . C-N (where N is a positive integer) of host computers, storage 204, a cloud management server 206, a network manager 208, a recovery profile manager 210 and the primary recovery manager 108. The clusters of host computers are used to support or host the clients 104 that can execute various applications. The exact number of host computer clusters situated at the primary site can be from a few clusters to tens of clusters or more. The clusters may be connected to other components at the primary site, as well as components outside of the primary site, via the network.

Thus, the clients running in the clusters are able to communicate with any process or device connected to the network.

In the illustrated embodiment, each of the clusters C-1, C-2 . . . C-N includes a number of host computers H-1, H-2 . . . H-M (where M is a positive integer) and a cluster management server 212. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. The host computers may be servers that are commonly found in datacenters. As an example, the host computers may be servers installed in one or more server racks. In an embodiment, the host computers of a cluster are located within the same server rack. Since the clusters are connected to the network 202, each of the host computers in the clusters is able to access any process and device connected to the network. In particular, each of the host computers in the clusters is able to access the storage 204 via the network and may share the resources provided by the storage with the other host computers. Consequently, any client running on any of the host computers may also access the storage via the network.

Figure 3:
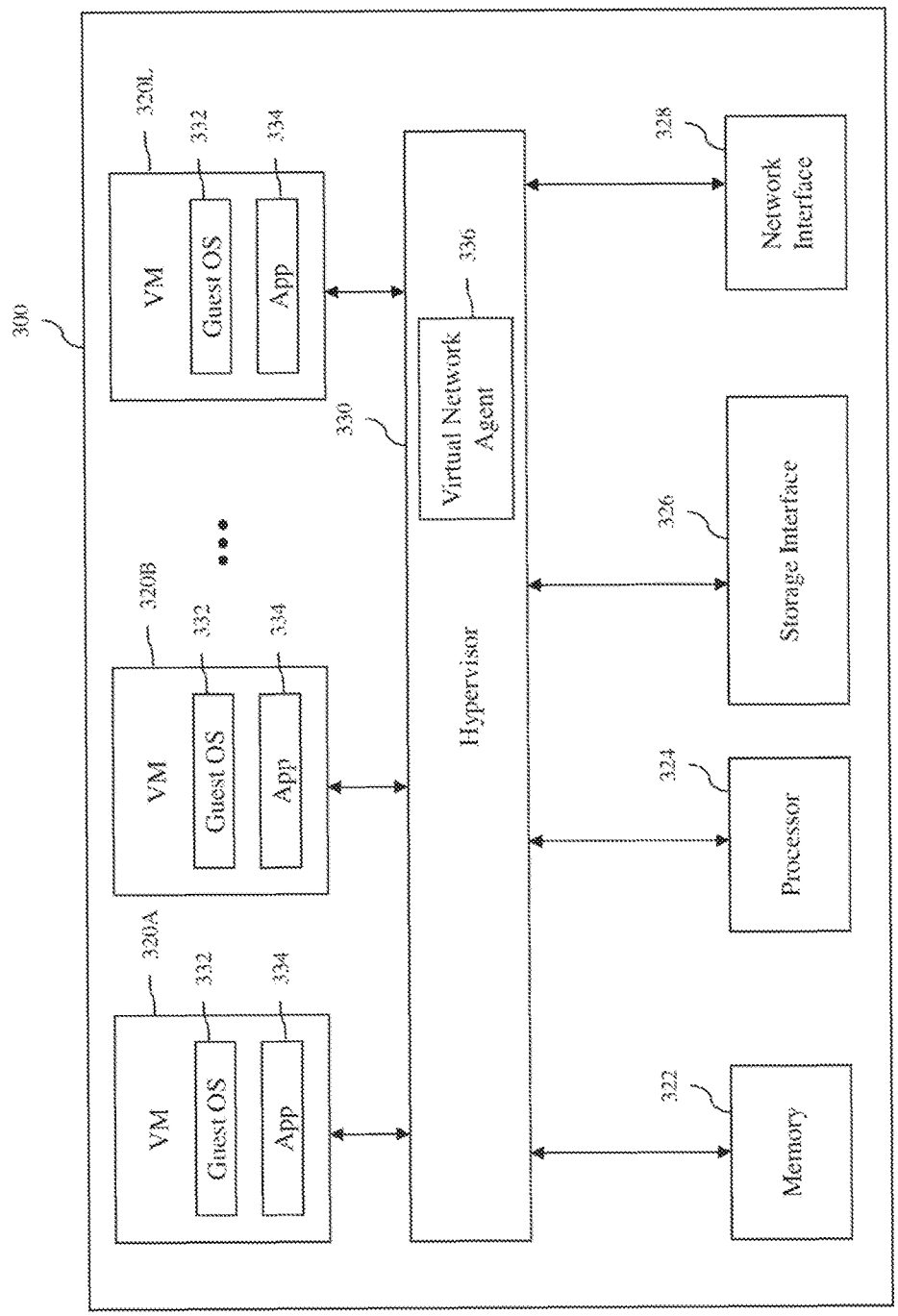
FIG. 3 is a block diagram of a host computer in accordance with an embodiment of the invention.

Turning now to FIG. 3, components of a host computer 300 that is representative of the host computers H-1, H-2 . . . H-M in accordance with an embodiment of the invention are shown. In FIG. 3, the physical connections between the various components of the host computer are not illustrated. In the illustrated embodiment, the host computer is configured to support a number of clients 320A, 320B . . . 320L (where L is a positive integer), which are VMs in this embodiment. However, in other embodiments, the clients can be any software entity. The number of VMs supported by the host computer can be anywhere from one to more than one hundred. The exact number of VMs supported by the host computer is only limited by the physical resources of the host computer. The VMs share at least some of the hardware resources of the host computer, which include system memory 322, one or more processors 324, a storage interface 326, and a network interface 328. The system memory 322, which may be random access memory (RAM), is the primary memory of the host computer. The processor 324 can be any type of a processor, such as a central processing unit (CPU) commonly found in a server. The storage interface 326 is an interface that allows that host computer to communicate with the storage 204. As an example, the storage interface may be a host bus adapter or a network file system interface. The network interface 328 is an interface that allows the host computer to communicate with other devices connected to the network 202. As an example, the network interface may be a network adapter.

In the illustrated embodiment, the VMs 320A, 320B . . . 320L run on "top" of a hypervisor 330, which is a software interface layer that enables sharing of the hardware resources of the host computer 300 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system 332 and one or more guest applications 334. The guest operating system manages virtual system resources made available to the corresponding VM by hypervisor 330, and, among other things, the guest operating system forms a software platform on top of which the guest applications run.

Similar to any other computer system connected to the network 202, the VMs 320A, 320B . . . 320L are able to communicate with other computer systems connected to the network using the network interface 328 of the host computer 300. In addition, the VMs are able to access the storage 204 using the storage interface 326 of the host computer.

The host computer 300 further includes a virtual network agent 336. The virtual network agent operates with the hypervisor 330 to provide virtual networking capabilities, such as bridging, L3 routing, L2 switching and firewall capabilities, so that software defined networks or virtual networks can be created. In a particular embodiment, the virtual network agent may be part of a VMware NSX™ virtual network product installed in the recovery system 100.

Turning back to FIG. 2, each of the cluster management servers 212 in the clusters C-1, C-2 . . . C-N operates to monitor and manage the host computers H-1, H-2 . . . H-M in the respective cluster. Each cluster management server may be configured to monitor the current configurations of the host computers and the clients, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The "demand," or current usage, of the clients for the consumable resources, such as CPU, memory, network, and storage, are measured by the host computers hosting the clients and provided to the respective cluster management server.

The cluster management servers 212 may also perform various operations to manage the clients and the host computers H-1, H-2 . . . H-M in their respective clusters. As illustrated in FIG. 1, in an embodiment, each cluster management server includes a cluster resource management module (CRMM) 218, which can be enabled by a user, to perform resource allocations and load balancing in the respective cluster. The cluster resource management module operates to allocate available resources among clients running in the cluster based on a number of parameters, which may include predefined rules and priorities. The cluster resource management module may be configured to power down particular clients and/or host computers in the cluster to conserve power. The cluster resource management module may be further configured to perform initial placement or deployment of clients in the host computers of the respective cluster at the primary site 102, as well as subsequent placement or migration of the existing clients in different host computers of the respective cluster. The cluster resource management module may further be configured or programmed to perform other operations to manage the cluster. Each cluster management server may also include a cluster storage resource management module (CSRMM) 220, which can be enabled by a user, to perform storage resource management for the respective cluster. The cluster storage resource management module is configured to place files of clients being placed or migrated, such as virtual disk files and configuration files, to particular volumes and/or datastores in the storage 204. The cluster resource management module and the cluster storage resource management module uses various policies or rules to place clients, including files of the clients, to particular host computers and datastores. Some of these placement rules may involve resource requirements of the clients, such as computing, memory, network and storage requirements. Some of these placement rules may involve affinity or anti-affinity rules to selectively place clients in host computers and datastores, which may be mandatory or preferential. Affinity rules may specify that clients should be placed in the same host computer or that files of the clients should be placed in the same datastore. Anti-affinity rules may specify that clients should not be placed in the same host computer or that files of the clients should not be placed in the same datastore.

In some embodiments, each cluster management server 212 provides a user interface so that a user can input commands related to various aspects of cluster management. The user interface may be used to create storage profiles for clients running in the respective cluster. These storage profiles may list the storage capabilities that files of the clients, such as virtual disk file and configuration files, require to properly support the operation of the clients. The storage profile of a client is used by the cluster storage resource management module 220 to place the files of that client in appropriate datastore(s).

In some embodiments, the cluster management servers 212 may be physical computers with each computer including at least memory and one or more processors, similar to the host computer 300. In other embodiments, the cluster management servers may be implemented as software programs running on physical computers, such as the host computer 300 shown in FIG. 3, or virtual computers, such as the VMs 320A, 320B . . . 320L. In an implementation, the cluster management servers are VMware® vCenter™ servers with at least some of the features available for such servers, the cluster resource management modules 218 in the cluster management servers are VMware vSphere® Distributed Resource Schedulers™, and the cluster storage resource management modules 220 in the cluster management servers are VMware® Storage Distributed Resource Schedulers™.

The network 202 can be any type of computer network or a combination of networks that allows communications between devices connected to the network. The network 202 may include the Internet, a wide area network (WAN), a local area network (LAN), a storage area network (SAN), a fibre channel network and/or other networks. The network 202 may be configured to support protocols suited for communications with storage arrays, such as Fibre Channel, Internet Small Computer System Interface (iSCSI), Fibre Channel over Ethernet (FCoE) and HyperSCSI.

The storage 204 is used to store data for the host computers of the clusters C-1, C-2 . . . C-N, which can be accessed like any other storage device connected to computer systems. The storage may support taking "storage snapshot". Each storage snapshot provides a consistent view of the data content on the storage at a given point in time. In an embodiment, the storage can be accessed by entities, such as clients running on the host computers, using any file system, e.g., virtual machine file system (VMFS) or network file system (NFS). The storage includes one or more computer data storage devices 214, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 216, which manages the operation of the storage. In an embodiment, the storage managing module is a computer program executing on one or more physical computers at the primary site 102. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may be used to store snapshots of clients, e.g., VMs, which may include some or all of the files of the clients. The storage may support any storage or database replication process controlled by the replication mechanisms 106 so that client information stored in the storage at the primary site 102 are automatically replicated in storage at the secondary site 102'.

The cloud management server 206 operates to monitor and manage the clusters C-1, C-2 . . . C-N to provide a cloud computing environment using the host computers H-1, H-2 . . . H-M in the clusters. The cloud management server allows administrators to create and use virtual datacenters (VDCs) with specified resource requirements. A single VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. In other embodiments, the cloud management server may be implemented as a software program running on a physical computer or a VM, which may be part of one of the clusters C-1, C-2 . . . C-N. In an implementation, the cloud management server is a server running VMware® vCloud Director® product. The cluster management server may maintain or store information regarding the clients 104 at the primate site 102, such as to which VDCs the clients belong, in any storage accessible by the cloud management server, such as the storage 204. In some embodiments, the cloud management server may include a placement engine that performs a placement analysis to determine which cluster or clusters to place clients being deployed using one or more placement rules.

The network manager 208 operates to manage and control virtual networks at the primary site 102. Virtual networks, also referred to as logical overlay networks, comprise logical network devices and connections that are then mapped to physical networking resources in a manner analogous to the manner in which other physical resources as compute and storage are virtualized. The network manager has access to information regarding the physical network components at the primary site, such as host computers, switches and routers, as well as virtual network configurations, such as VMs, and the logical network connections between them. With the physical and virtual network information, the network manager may map the logical network configurations, e.g., logical switches, routers, and security devices to the physical network components that convey, route, and filter physical traffic in the primary site. Thus, the network manager maintains various network information, such as information regarding firewall rules and routing rules. The network manager may store the network information in any storage accessible by the network manager, such as the storage 204. In one particular implementation, the virtual network manager is a VMware NSX™ manager running on a physical computer at the primary site.

The primary recovery manager 108 at the primary site 102 controls various operations at the primary site to provide disaster protection. The primary recovery manager may control the processes for creating and managing recovery plans, including the type of replication process to use for the individual clients running at the primary site. The primary recovery manager may also control the mapping of the protected clients to appropriate resources on the secondary site 102'. The primary recovery manager uses disaster recovery options associated with each client to control these recovery operations with respect to that client. These recovery options may include, but are not limited to, options for replication type/techniques, recovery point objective (RPO) duration, recovery time objective (RTO) duration, quiescing method (e.g., "MS volume shadow copy VSS"), point in time instance and storage information, such as datastores at the primary site and/or the secondary site and storage profiles for the primary site and/or the secondary site. Conventionally, these disaster recovery options for the clients running at the primary site were manually entered by one or more users, such as administrators. However, as described in more detail below, in accordance with embodiments of the invention, the desired client recovery options may be automatically associated with the individual clients running at the primary site using the recovery profile manager 210.

The recovery profile manager 210 is configured to allow users or administrators to create different recovery profiles to be associated with clients being deployed or already running at the primary site 102. Each recovery profile includes preset disaster recovery options or parameters to be used for recovery processes managed by the primary recovery manager 108, such as replication process, nondisruptive recovery testing and site recovery. As an example, the disaster recovery parameter settings included in each recovery profile may include, but are not limited to, options for replication type/techniques, recovery point objective (RPO) duration, recovery time objective (RTO) duration, quiescing method, point in time instance and storage information, such as datastores at the primary site and/or the secondary site and storage profiles for the primary site and/or the secondary site. The disaster recovery parameter settings included in the recovery profiles depends on the primary recovery manager, and thus, may include different disaster recovery parameters when being used with different recovery managers. Each recovery profile may also be associated with or includes storage information, such as a storage profile or a group of datastores, which is used to determine the datastore(s) at the primary site to store the files of a client associated with this recovery profile. In some embodiments, the recovery profiles are configured to resolve any conflicts between the recovery profiles and placement rules being applied by the cloud management server 206 and/or the cluster management servers 212.

Figure 4:
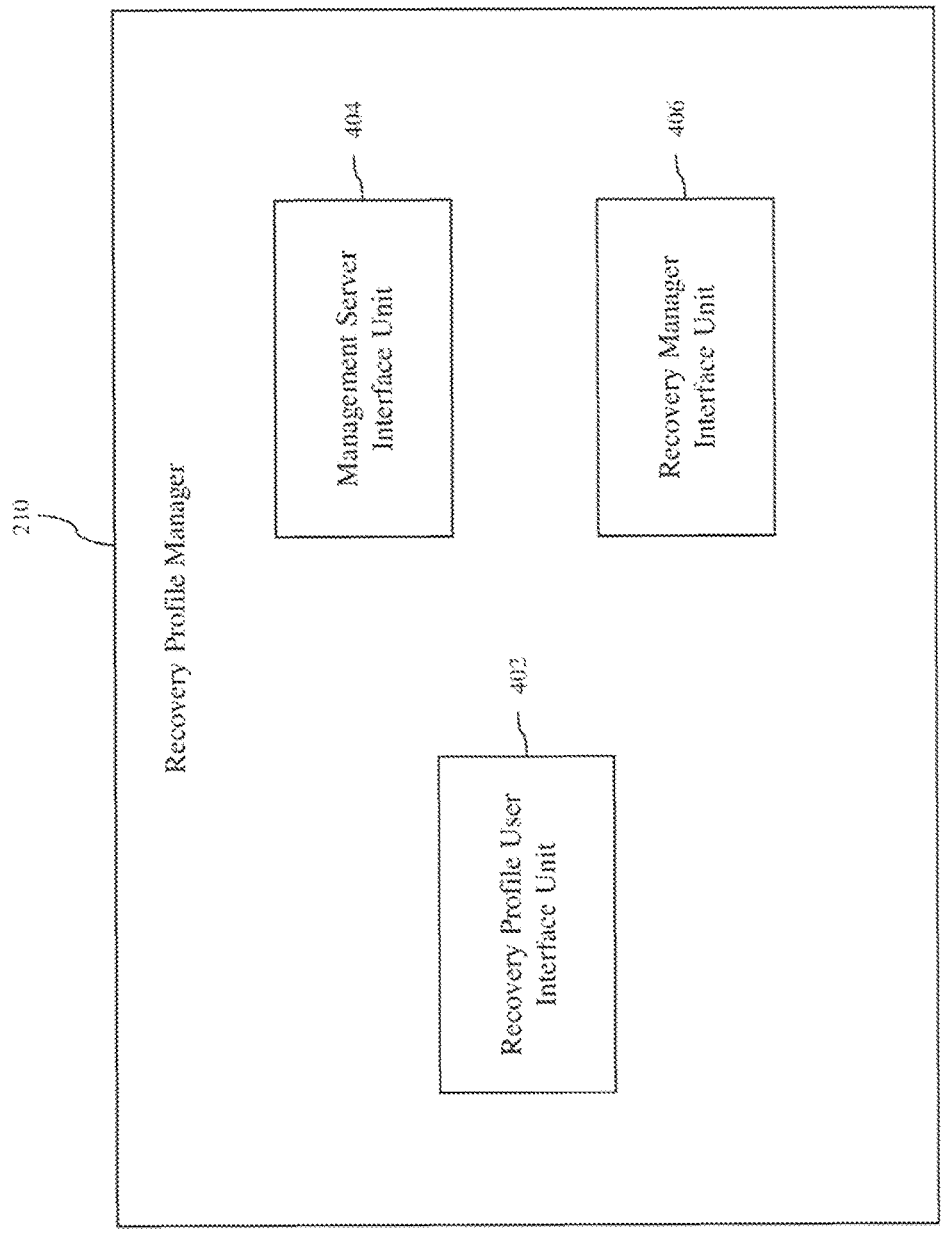
FIG. 4 is a block diagram of a recovery profile manager in accordance with an embodiment of the invention.

Turning now to FIG. 4, components of the recovery profile manager 210 in accordance with an embodiment of the invention are illustrated. As shown in FIG. 4, the recovery profile manager includes a recovery profile user interface unit 402, a management server interface unit 404 and a recovery manager interface unit 406. These components of the recovery profile manager may be implemented in any combination of software and hardware. In a particular implementation, the components of the recovery profile manager are software modules that are executed on one or more physical computer systems.

The recovery profile user interface unit 402 of the recovery profile manager 210 is configured to provide a user interface for a user, such as an administrator, to create different recovery profiles and to selectively associate clients to the recovery profiles. The user interface, which may be a graphical user interface, may provide means for the user to enter settings for different recovery options or parameters to create different recovery profiles. As an example, the user interface may provide different options or choices for the replication technique to use, such as VMware vSphere® Replication or array-based replication. When the user selected a particular replication technique from the options presented, the selected replication technique is added to the recovery profile being created. As another example, the user interface may provide a field for the user to enter an RPO value. When the user enters a particular RPO value, the entered RPO value is added to the recovery profile being created. By selecting settings for the various recovery options, unique recovery profiles can be created.

The user interface provided by the recovery profile user interface unit 402 may also allow the user to associate or attach storage parameters or information to the recovery profiles. As an example, the user interface may allow the user to associate one or more datastores to a recovery profile to limit the datastores at the primary site in which files of clients that are associated with the recovery profile can be stored. As another example, the user interface may allow the user to associate a storage profile for the secondary site to the recovery profile so that a replication process can use the storage profile.

The user interface provided by the recovery profile user interface unit 402 may also allow the user to associate or attach a particular recovery profile that was created to a client or a group of clients being deployed at the primary site 102 or a client or a group of clients currently running at the primary site. In some embodiments, another component at the primary site, such as one of the cluster management servers 212 or the cloud management server 206, may call on the recovery profile user interface unit to allow a user to attach one or more recovery profiles to one or more clients being managed by that component.

The user interface provided by the recovery profile user interface unit 402 may also allow the user to modify recovery profiles that have been created, as well as the associations of the recovery profiles to storage information and clients. Thus, one or more recovery parameter settings of an existing recovery profile or one or more associations to that recovery profile may be edited using the user interface to modify that recovery profile or associations to the recovery profile. In addition, any existing recovery profiles or associations to the recovery profiles may be deleted using the user interface.

The management server interface unit 404 of the recovery profile manager 402 operates to interface with the cluster management servers 212 and/or the cloud management server 206, to resolve any conflicts between an operation being performed with respect to a client by one of the cluster management servers or the cloud management server and any parameter in a recovery profile associated with that client. As an example, if a recovery profile includes a group of datastores at the primary site to be used to store the files of a client associated with this recovery profile and that client is also associated with a storage profile for the primary site that conflicts with the group of datastores, the management server interface unit would resolve this conflict by overriding the storage profile with the group of datastores specified in the recovery profile. As another example, the management server interface unit would give priority to the recovery profile with respect to any conflict between the recovery profile and the placement rules being applied by the cluster management servers and/or the cloud management server, e.g., conflicts between affinity or anti-affinity rules for host computers, storage devices and/or datastores being applied to a client being placed and the recovery profile associated with that client.

The recovery manager interface unit 406 of the recovery profile manager 210 operates to interface with the primary recovery manager 108 to provide recovery information contained in recovery profiles associated with clients to the primary recovery manager so that the primary recovery manager can initiate operations related to disaster recovery protection for the associated clients. Thus, when a client being deployed at the primary site has been associated with a recovery profile, the recovery manager interface unit will interface with the primary recovery manager to provide various recovery parameter settings contained in the recovery profile. In response, the primary recovery manager can initiates one or more recovery-related operations using the appropriate parameter settings defined in the recovery profile. As an example, the primary recovery manager may initiate a replication process for the client using one of the replication mechanisms 106 corresponding to the replication option setting defined in the recovery profile associated with that client.

In the illustrated embodiment, the recovery profile manager 210 is a separate module. However, in other embodiments, the recovery profile manager may be incorporated into one or more other components at the primary site 102. In a particular implementation, the recovery profile manager is integrated into the primary recovery manager 108. In other embodiments, some of the functions of the recovery profile manager, such as interfacing with the cluster management servers 212 and/or the cloud management server 206 and resolving conflicts between recovery profiles and placements rules being applied by the cluster management servers and/or the cloud management server, may be performed by other components at the primary site, including the cluster management servers and/or the cloud management server.

Figure 5:
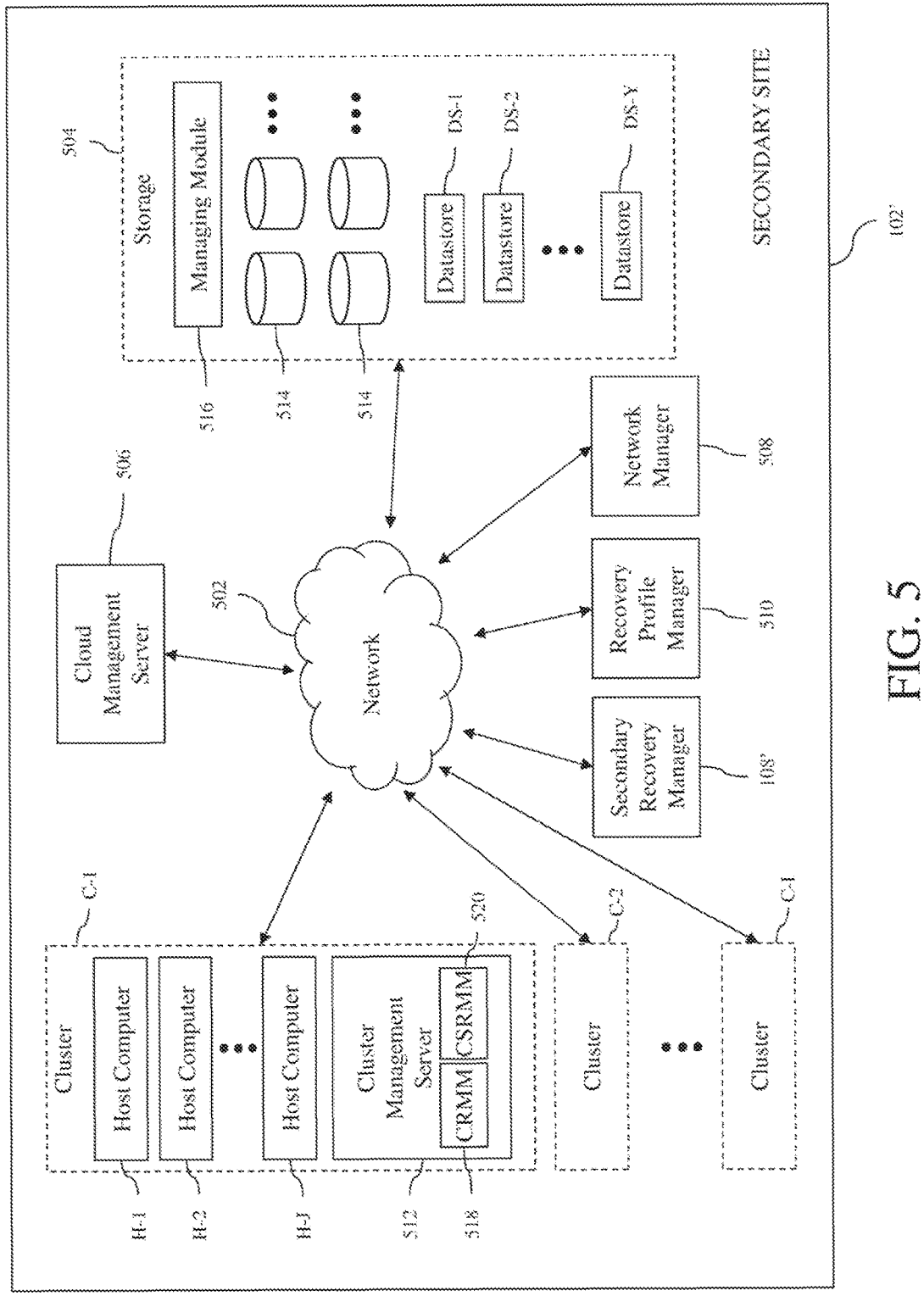
FIG. 5 is a block diagram of a secondary site of the site recovery system in accordance with an embodiment of the invention.

Turning now to FIG. 5, the secondary site 102' in accordance with an embodiment of the invention is shown. As shown in the illustrated embodiment of FIG. 5, the secondary site may include all the components found in the primary site 102 so that the protected clients 104 at the primary site can be recreated or recovered at the secondary site. However, in other embodiments, the secondary site may have fewer or more components than the primary site. In the illustrated embodiment, the secondary site includes a network 502, clusters C-1, C-2 . . . C-I (where I is a positive integer) of host computers H-1, H-2 . . . H-J (where J is a positive integer), storage 504, a cloud management server 506, a network manager 508, a recovery profile manager 510 and the secondary recovery manager 108'. The storage 504 includes one or more computer data storage devices 514 and a storage managing module 516, which support a number of datastores DS-1, DS-2 . . . DS-Y (where Y is a positive integer). The network 502, the clusters C-1, C-2 . . . C-I (including a cluster management server 512 with a cluster resource management module 518 and a cluster storage resource management module 520 for each cluster), the storage 504 (including a data storage devices 514 and a storage managing module 516), the cloud management server 506, the network manager 508 and the recovery profile manager 510 at the secondary site may be similar or identical to the network 202, the clusters C-1, C-2 . . . C-N, the storage 204, the cloud management server 206, the network manager 208 and the recovery profile manager 210 at the primary site. In some embodiments, the cluster management servers 512, the storage managing module 516, the cloud management server 506, the network manager 508 and/or the recovery profile manager 510 may not be powered on or instantiated until needed, e.g., when a failure occurs at the primary site.

The secondary recovery manager 108' controls various operations at the secondary site 102' to provide disaster protection. In particular, the secondary recovery manager continuously communicates with the primary recovery manager 108 to detect when a failure occurs at the primary site 102. When a disaster recovery is needed, e.g., a failure is detected at the primary site, the secondary recovery manager may selects data for the protected clients 104, e.g., a storage snapshot or a set of client snapshots for a particular point in time, which is/are stored in the storage 504, to recreate the protected clients at the secondary site as the replicated clients.

Figure 6:
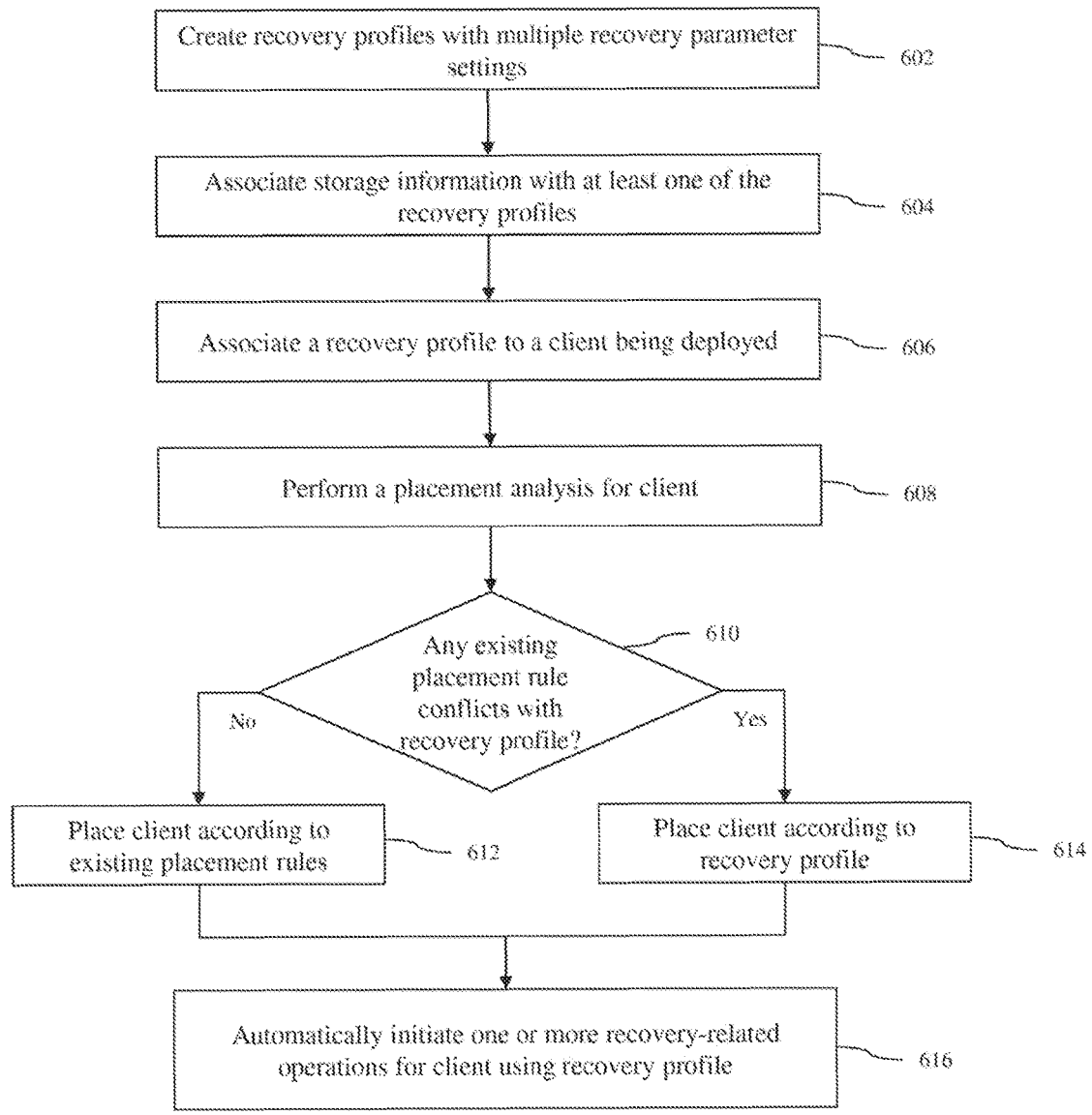
FIG. 6 is a flow diagram of a method for deploying clients with disaster recovery considerations in accordance with an embodiment of the invention.

A method for deploying clients, such as VMs, at a primary site, e.g., the primary site 102, with disaster recovery considerations in accordance with an embodiment of the invention is now described with reference to the process flow diagram of FIG. 6. At block 602, recovery profiles with multiple recovery parameter settings are created. As an example, the recovery profiles may be created using a user interface provided by the recovery profile user interface unit 402 of the recovery profile manager 210. At block 604, storage information may be associated with at least one of the recovery profiles. The storage information may include a group of datastores at the primary site to which clients are to be deployed or provisioned. The storage information may also include a storage profile for a secondary site, which would typically define a datastore at the secondary site to which clients are to be deployed or provisioned.

At block 606, one of the recovery profiles is associated with a client being deployed. At block 608, a placement analysis is performed using one or more placement rules or policies. As an example, the cloud management server 206 may execute a cluster-level placement algorithm to determine a cluster to place a client and a cluster management server 212 of that determined cluster may execute a host-level placement algorithm to determine a host computer and a datastore to place the client.

At step 610, a determination is made whether any existing placement rule conflicts with the recovery profile associated with the client. As an example, if a storage profile feature is enabled at the primary site and a storage profile is associated with the client, a determination is made whether the storage profile associated with the client conflicts with the recovery profile associated with the client, e.g., the selected datastore for placement of the client based on the storage profile is not one of the datastores defined in the recovery profile. As another example, if a cluster resource management module 218 and/or a cluster storage resource management module 220 of a cluster management server 212 is/are enabled, a determination is made whether a host computer and/or a datastore selected for placement of the client by one or both of these modules conflict(s) with the recovery profile, e.g., the selected datastore for placement of the client is not one of the datastores defined in the recovery profile.

If there is no conflict, then the client is placed in accordance with existing placement rules, at block 612. As an example, the cloud management server 206 and/or one of the cluster management servers 212 will place the client using placement rules of a placement analysis executed by the server(s). If there is a conflict, then the client is placed in accordance with the recovery profile, at block 614. As an example, this may involve using the datastore(s) defined in the recovery profile instead of the datastore(s) defined in a storage profile to place the client by a cluster management server. As another example, this may involve overriding placement rule(s) used by a cluster resource management module 218 and/or a cluster storage resource management module 220 of a cluster management server 212 with rules according to the recovery profile.

At block 616, one or more recovery-related operations for the client are automatically initiated using the recovery profile associated with the client. These recovery-related operations may be initiated by a site recovery manager at the primary site using one or more parameter settings defined in the recovery profile associated with the client that has now been placed. The recovery-related operations may include a replication process to replicate files of the client at the secondary site. The particular replication process selected for the client is determined by a replication parameter setting defined in the recovery profile associated with the client. As an example, the selected replication process may be a proprietary replication, such as VMware vSphere® Replication, or an array-based replication. In this fashion, clients can be deployed with disaster recovery consideration using recovery profiles so that the clients will automatically be configured with disaster recovery protection.

In other embodiments, the recovery profiles may be used on clients already running at the primary site. In these embodiments, the recovery profiles are again used to automatically initiate one or more recovery-related operations for the clients associated with the recovery profiles so that these clients are protected. Again, any conflicts between the recovery profiles and rules being applied by any component at the primary site, such as a cluster management server 212, will be resolved in favor of the recovery parameter settings of the recovery profiles.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for deploying clients at a primary site with disaster recovery considerations, the method comprising:
   creating recovery profiles with multiple recovery parameter settings;
   associating one of the recovery profiles with a client to be deployed at the primary site and hosted on one of a plurality of host computers at the primary site;
   performing a placement analysis for the client to determine a host computer and a datastore to place the client at the primary site;
   if there is no conflict between any existing placement rule for the placement analysis and the recovery profile associated with the client, placing the client at the primary site according to the placement analysis, and if there is conflict between any existing placement rule for the placement analysis and the recovery profile associated with the client, placing the client at the primary site according to the recovery profile; and
   automatically initiating a recovery-related operation for the client at a secondary site using a recovery parameter setting defined in the recovery profile associated with the client.

2. The method of claim 1, wherein the automatically initiating the recovery-related operation for the client includes automatically initiating a replication operation in accordance with a replication setting defined in the recovery profile associated with the client.

3. The method of claim 2, wherein the replication operation is a proprietary replication or an array-based replication and the replication setting specifies the proprietary replication or the array-based replication.

4. The method of claim 1, wherein the creating the recovery profiles with multiple recovery parameter settings includes selecting a recovery point objective value.

5. The method of claim 1, wherein the creating the recovery profiles with multiple recovery parameter settings includes selecting a point in time for recovery.

6. The method of claim 1, further comprising associating storage information with at least one of the recovery profiles, the storage information indicating where to store files related to the client being deployed.

7. The method of claim 6, wherein the storage information associated with at least one of the recovery profiles includes at least one datastore to store one or more files of the client being deployed.

8. A non-transitory computer-readable storage medium containing program instructions for method for deploying clients at a primary site with disaster recovery considerations, wherein execution of the program instructions by one or more processors of a computer system causes the one or more processors to perform steps comprising:
   creating recovery profiles with multiple recovery parameter settings;
   associating one of the recovery profiles with a client to be deployed at the primary site and hosted on one of a plurality of host computers at the primary site;
   performing a placement analysis for the client to determine a host computer and a datastore to place the client at the primary site;
   if there is no conflict between any existing placement rule for the placement analysis and the recovery profile associated with the client, placing the client at the primary site according to the placement analysis, and if there is conflict between any existing placement rule for the placement analysis and the recovery profile associated with the client, placing the client at the primary site according to the recovery profile; and
   automatically initiating a recovery-related operation for the client at a secondary site using a recovery parameter setting defined in the recovery profile associated with the client.

9. The computer-readable storage medium of claim 8, wherein the automatically initiating the recovery-related operation for the client includes automatically initiating a replication operation in accordance with a replication setting defined in the recovery profile associated with the client.

10. The computer-readable storage medium of claim 9, wherein the replication operation is a proprietary replication or an array-based replication and the replication setting specifies the proprietary replication or the array-based replication.

11. The computer-readable storage medium of claim 8, wherein the creating the recovery profiles with multiple recovery parameter settings includes selecting a recovery point objective value.

12. The computer-readable storage medium of claim 8, wherein the creating the recovery profiles with multiple recovery parameter settings includes selecting a point in time for recovery.

13. The computer-readable storage medium of claim 8, wherein the steps further comprise associating storage information with at least one of the recovery profiles, the storage information indicating where to store files related to the client being deployed.

14. The computer-readable storage medium of claim 13, wherein the storage information associated with at least one of the recovery profiles includes at least one datastore to store one or more files of the client being deployed.

15. A system for deploying clients at a primary site with disaster recovery considerations comprising:
   memory; and
   at least one processor configured to:
      create recovery profiles with multiple recovery parameter settings;
      associate one of the recovery profiles with a client to be deployed at the primary site and hosted on a host computer at the primary site;
      perform a placement analysis for the client to determine a host computer and a datastore to place the client at the primary site;
      if there is no conflict between any existing placement rule for the placement analysis and the recovery profile associated with the client, placing the client at the primary site according to the placement analysis, and if there is conflict between any existing placement rule for the placement analysis and the recovery profile associated with the client, placing the client at the primary site according to the recovery profile; and
      automatically initiate a recovery-related operation for the client at a secondary site using a recovery parameter setting defined in the recovery profile associated with the client.

16. The system of claim 15, wherein the at least one processor is configured to automatically initiate a replication operation in accordance with a replication setting defined in the recovery profile associated with the client.

17. The system of claim 16, wherein the replication operation is a proprietary replication or an array-based replication and the replication setting specifies the proprietary replication or the array-based replication.

* * * * *